US011604969B2

(12) United States Patent
Cheng et al.

(10) Patent No.: US 11,604,969 B2
(45) Date of Patent: Mar. 14, 2023

(54) PERFORMANCE PREDICTION FROM COMMUNICATION DATA

(71) Applicant: NEC Laboratories America, Inc., Princeton, NJ (US)

(72) Inventors: Wei Cheng, Princeton Junction, NJ (US); LuAn Tang, Pennington, NJ (US); Dongjin Song, Princeton, NJ (US); Bo Zong, West Windsor, NJ (US); Haifeng Chen, West Windsor, NJ (US); Jingchao Ni, Princeton, NJ (US); Wenchao Yu, Plainsboro, NJ (US)

(73) Assignee: NEC Corporation ( * ) Notice: Subject to any disclaimer, the term of this patent is extended or adjusted under 35 U.S.C. 154(b) by 829 days.

(21) Appl. No.: 16/553,465

(22) Filed: Aug. 28, 2019

(65) Prior Publication Data
US 2020/0090025 A1  Mar. 19, 2020

Related U.S. Application Data

(60) Provisional application No. 62/732,624, filed on Sep. 18, 2018.

(51) Int. Cl.
G06N 3/08 (2006.01)
G06N 5/02 (2006.01)
G06N 3/049 (2023.01)

(52) U.S. Cl.
CPC .............. G06N 3/049 (2013.01); G06N 3/08 (2013.01); G06N 5/02 (2013.01)

(58) Field of Classification Search
CPC .................................. G06N 3/08; G06N 5/02
See application file for complete search history.

(56) References Cited

U.S. PATENT DOCUMENTS

| | | | |
|---|---|---|---|
| 2017/0279694 A1* | 9/2017 | Sartran | H04L 41/14 |
| 2019/0138423 A1* | 5/2019 | Agerstam | G06F 11/3452 |
| 2019/0171633 A1* | 6/2019 | Demla | G06F 16/2358 |
| 2019/0324831 A1* | 10/2019 | Gu | G06F 11/0775 |
| 2020/0127882 A1* | 4/2020 | Upadhya | H04L 41/12 |
| 2020/0210854 A1* | 7/2020 | Srinivasan | G06N 3/08 |
| 2021/0157310 A1* | 5/2021 | Lavid Ben Lulu | G06N 20/00 |

OTHER PUBLICATIONS

Akoglu, Leman, Hanghang Tong, and Danai Koutra. "Graph based anomaly detection and description: a survey." Data mining and knowledge discovery 29.3 (2015): 626-688. (Year: 2015).*

(Continued)

Primary Examiner — Hal Schnee
(74) Attorney, Agent, or Firm — Joseph Kolodka

(57) ABSTRACT

Systems and methods for predicting system device failure are provided. The method includes representing device failure related data associated with the devices from a predetermined domain by temporal graphs for each of the devices. The method also includes extracting vector representations based on temporal graph features from the temporal graphs that capture both temporal and structural correlation in the device failure related data. The method further includes predicting, based on the vector representations and device failure related metrics in the predetermined domain, one or more of the devices that is expected to fail within a predetermined time.

18 Claims, 10 Drawing Sheets

(56) References Cited

OTHER PUBLICATIONS

Cheng et al., "Ranking Causal Anomalies via Temporal and Dynamical Analysis on Vanishing Correlations", Proceedings of the 22nd ACM SIGKDD International Conference on Knowledge Discover & Data Mining. Aug. 13, 2016. pp. 805-814.

Song et al., "TGNet: Learning to Rank Nodes in Temporal Graphs", Proceedings of the 27th ACM International Conference on Information and Knowledge Management. Oct. 17, 2018. pp. 97-105.

Yu et al., "NetWalk: A Flexible Deep Embedding Approach for Anomaly Detection in Dynamic Networks", Proceedings of the 24th ACM SIGKDD International Conference of Knowledge Discovery & Data Mining. Jul. 19, 2018. pp. 2672-2681.

Zong et al., "Behavior Query Discovery in System-Generated Temporal Graphs", Proceedings of the VLDB Endowment. Dec. 1, 2015. vol. 9, Issue 4. pp. 240-251.

\* cited by examiner

PERFORMANCE PREDICTION FROM COMMUNICATION DATA

RELATED APPLICATION INFORMATION

This application claims priority to U.S. Provisional Patent Application No. 62/732,624, filed on Sep. 18, 2018, incorporated herein by reference herein its entirety.

BACKGROUND

Technical Field

The present invention relates to deep learning and more particularly to applying deep learning for predicting the performance of devices.

Description of the Related Art

Deep learning is a machine learning method based on artificial neural networks. Deep learning architectures can be applied to fields including computer vision, speech recognition, natural language processing, audio recognition, social network filtering, machine translation, bioinformatics, drug design, medical image analysis, material inspection and board game programs, etc. Deep learning can be supervised, semi-supervised or unsupervised.

SUMMARY

According to an aspect of the present invention, a method is provided for predicting the performance of a plurality of devices. The method includes representing device failure related data associated with multiple devices from a predetermined domain by temporal graphs for each of the devices. The method also includes extracting vector representations based on temporal graph features from the temporal graphs that capture both temporal and structural correlation in the device failure related data. The method further includes predicting, based on the vector representations and the performance metrics in the predetermined domain, one more of the devices expected to fail within a predetermined time.

According to another aspect of the present invention, a system is provided for predicting the performance of a plurality of devices. The system includes a processor device operatively coupled to a memory device, the processor device being configured to represent device failure related data associated with multiple devices from a predetermined domain by temporal graphs for each of the devices. The processor device also extracts vector representations based on temporal graph features from the temporal graphs that capture both temporal and structural correlation in the device failure related data. The processor device also predicts, based on the vector representations and the performance metrics in the in the predetermined domain, one more of the devices expected to fail within a predetermined time.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
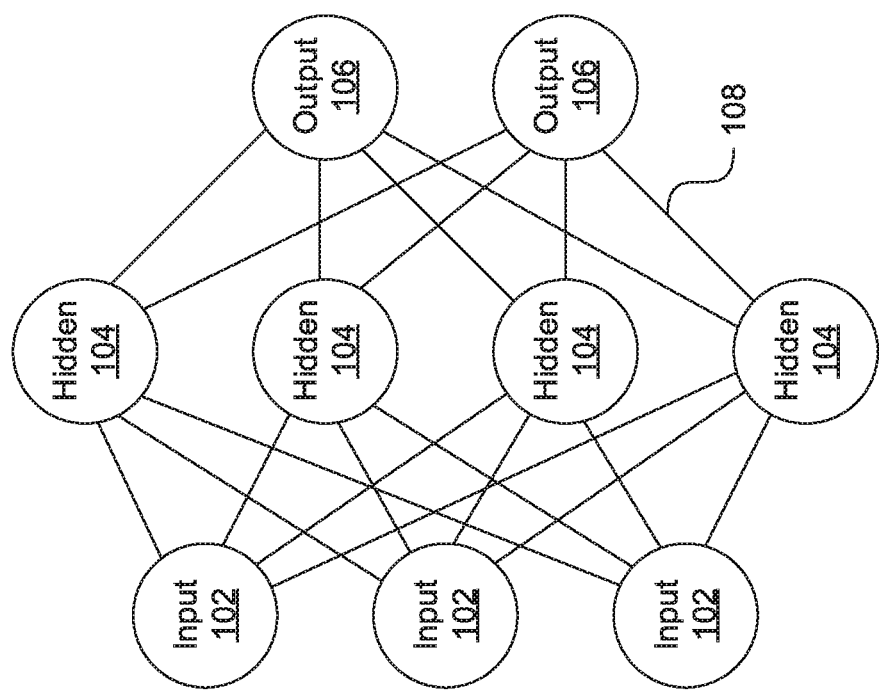
FIG. 1 is a generalized diagram of a neural network, in accordance with an embodiment of the present invention.

In accordance with embodiments of the present invention, systems and methods are provided for implementing device failure prediction from communication and profile data. In example embodiments, system failure prediction via graph learning (SFPGL) including, for example, an associated (for example, machine learning) framework) is applied to determine device failure prediction from communication and profile data.

In an example embodiment, to reduce time delay in decision process, SFPGL analyzes device's communication data (which are generated in real time) and profile data, instead of regular hardware report, to extract meaningful features for timely decision making. SFPGL then implements processes (for example, machine learning methods) to automatically model a decision process and address the scalability problems from associated with human decision makers (for example, human experts). SFPGL provides a general framework that is applicable to a class of prediction problems in system device management. The SFPGL based framework can include training and testing phases.

In an example embodiment, the processes can include feature interpretation in particular domains (for example, a system management domain, a financial domain, etc.) and can fully utilize multi-dimensional node and edge attributes to extract temporal and structural features simultaneously.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a generalized diagram of a neural network that can implement device failure prediction from communication data is shown, according to an example embodiment.

An artificial neural network (ANN) is an information processing system that is inspired by biological nervous systems, such as the brain. The key element of ANNs is the structure of the information processing system, which includes many highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

ANNs demonstrate an ability to derive meaning from complicated or imprecise data and can be used to extract patterns and detect trends that are too complex to be detected by humans or other computer-based systems. The structure of a neural network generally has input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There can be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. The training data can include communication and profile data collected from agents installed in servers (for example, stored in a database). Upon completion of a feed-forward computation, the output is compared to a desired output available from training data. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

Figure 2:
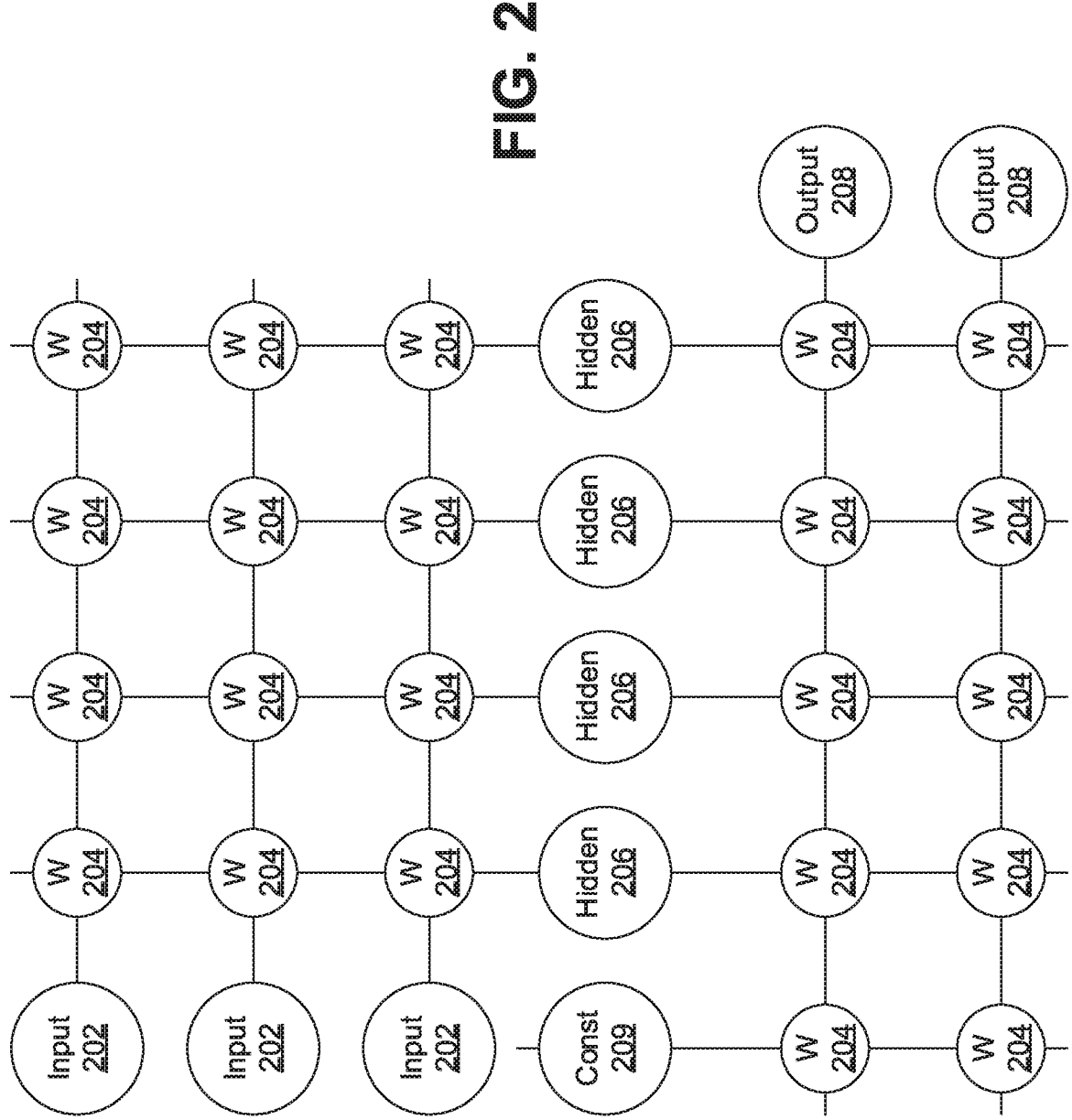
FIG. 2 is a diagram of an artificial neural network (ANN) architecture, in accordance with an embodiment of the present invention.

Referring now to FIG. 2, an artificial neural network (ANN) architecture 200 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, stopmax layers, or any other appropriate type of neural network layer. Furthermore, layers can be added or removed as needed and the weights can be omitted for more complicated forms of interconnection.

During feed-forward operation, a set of input neurons 202 each provide an input signal in parallel to a respective row of weights 204. In the hardware embodiment described herein, the weights 204 each have a respective settable value, such that a weight output passes from the weight 204 to a respective hidden neuron 206 to represent the weighted input to the hidden neuron 206. In software embodiments, the weights 204 may simply be represented as coefficient values that are multiplied against the relevant signals. The signals from each weight adds column-wise and flows to a hidden neuron 206.

The hidden neurons 206 use the signals from the array of weights 204 to perform some calculation. The hidden neurons 206 then output a signal of their own to another array of weights 204. This array performs in the same way, with a column of weights 204 receiving a signal from their respective hidden neuron 206 to produce a weighted signal output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are only used during feed-forward operation.

During back propagation, the output neurons 208 provide a signal back across the array of weights 204. The output layer compares the generated network response to training data and computes an error. The error signal can be made proportional to the error value. In this example, a row of weights 204 receives a signal from a respective output neuron 208 in parallel and produces an output which adds column-wise to provide an input to hidden neurons 206. The hidden neurons 206 combine the weighted feedback signal with a derivative of its feed-forward calculation and stores an error value before outputting a feedback signal to its respective column of weights 204. This back-propagation travels through the entire network 200 until all hidden neurons 206 and the input neurons 202 have stored an error value.

During weight updates, the stored error values are used to update the settable values of the weights 204. In this manner the weights 204 can be trained to adapt the neural network 200 to errors in its processing. It should be noted that the three modes of operation, feed forward, back propagation, and weight update, do not overlap with one another.

A convolutional neural networks (CNN) is a subclass of ANNs which has at least one convolution layer. A CNN consists of an input and an output layer, as well as multiple hidden layers. The hidden layers of a CNN consist of convolutional layers, rectified linear unit (RELU) layer (e.g., activation function), pooling layers, fully connected layers and normalization layers. Convolutional layers apply a convolution operation to the input and pass the result to the next layer. The convolution emulates the response of an individual neuron to visual stimuli.

CNNs can be applied to analyzing visual imagery. CNNs can capture local information (e.g., neighbor pixels in an image or surrounding words in a text) as well as reduce the complexity of a model (to allow, for example, faster training, requirement of fewer samples, and reduction of the chance of overfitting).

CNNs use a variation of multilayer perceptrons designed to require minimal preprocessing. CNNs are also known as shift invariant or space invariant artificial neural networks (SIANN), based on their shared-weights architecture and translation invariance characteristics. CNNs can be used for applications in image and video recognition, recommender systems, image classification, medical image analysis, and natural language processing.

Figure 3:
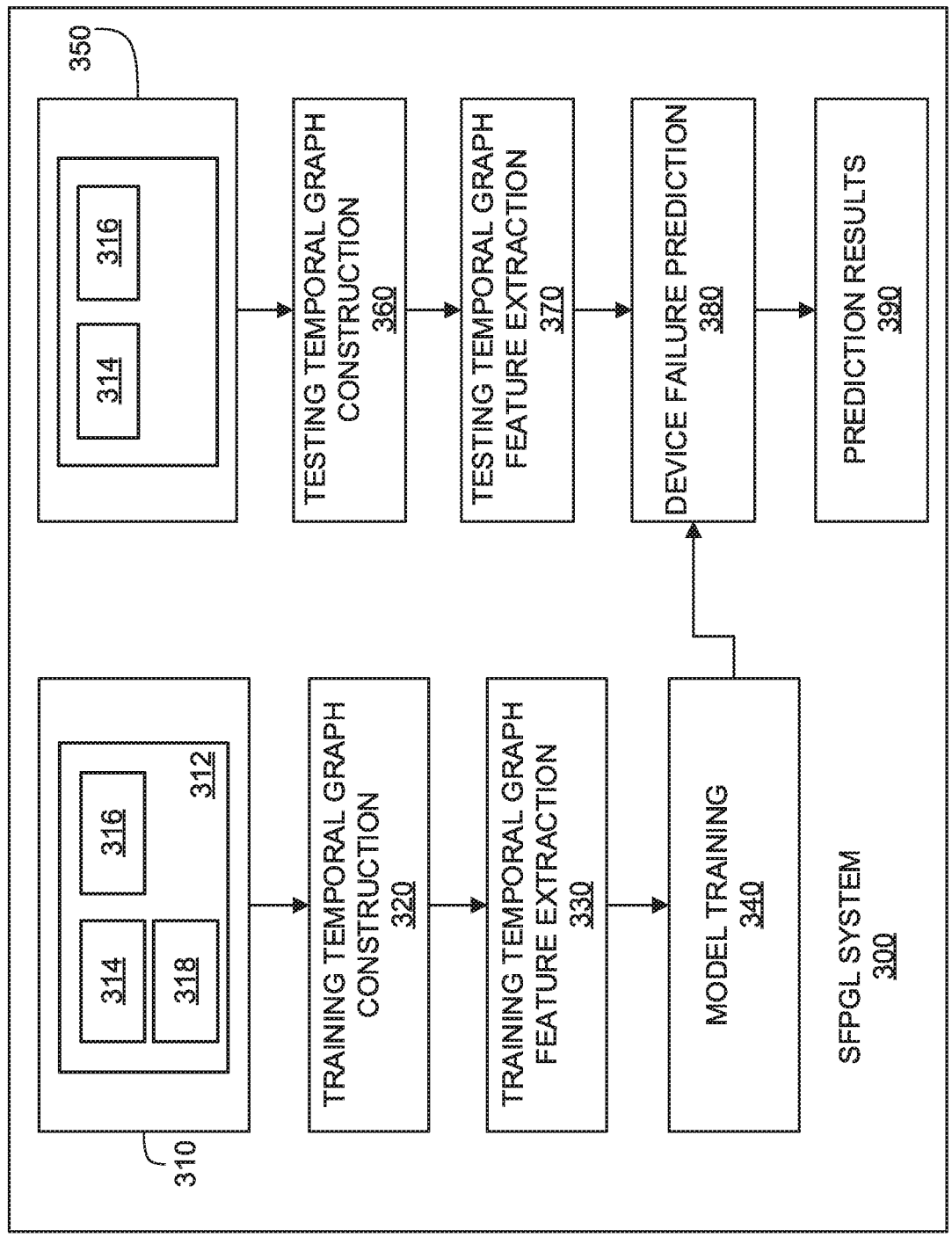
FIG. 3 is a block diagram illustrating a system that implements a process of system failure prediction via graph learning (SFPGL), in accordance with an embodiment of the present invention.

Referring now to FIG. 3, a block diagram illustrating a system 300 for implementing a process of system failure prediction via graph learning (SFPGL) for system device failure prediction, in accordance with example embodiments.

System device failure prediction is a critical problem in the domain of complex system management. For system administrators, one of the most important tasks is to decide whether a device could fail in near future and replace it before the failure happens. Usually, such decisions hinge on the evaluation of a device's hardware status, but it is usually costly to perform massive hardware investigation and the timing of hardware investigation may not meet the failure time of a device. In general, the problem can be defined as follows: Given system devices' historical records, the goal is to predict whether a system device could fail in near future (e.g., in one week).

SFPGL system 300 implements processes that perform server failure prediction in a distributed compute system as described herein below with respect to FIGS. 4 to 9. SFPGL system 300 can significantly reduce time delay in decision making and is able to scale with many devices and a large amount of complex system management related data.

As shown in FIG. 3, SFPGL system 300 includes a data training component 310, a training (or first) temporal graph construction component 320, a training (or first) temporal graph feature extraction component 330, a model training component 340, a data testing component 350, a testing (or second) temporal graph construction component 360, a testing (or second) temporal graph feature extraction component 370, a device failure prediction component 380 and a prediction results component 390.

Data training component 310 includes (or provides access to) training data 312. Training data 312 includes data used for model training for SFPGL. Training data 312 can include (for example, mainly) communication data 314 (among or between devices), device profile data 316, and a ground truth 318 of target device failure for devices in the training data. Data training component 310 can be implemented to provide data during a training phase of the SFPGL system 300.

Communication data 314 can include historical information indicating at which time one device (for example, device A) conducts communication with another device (for example, device B). Additionally, communication data 314 can include additional and/or supplementary (for example, side) information that describes communication details, such as the amount of data transfer during this communication, purpose of this communication, etc.

Device profile data 316 contains information related to individual devices, such as device type, device failure history, device age, etc. In some example embodiments, device profile data 316 can also include also evolve over time. For example, device failure history could (be dynamically updated to) include new failure incident.

Ground truth of target device failure 318 is obtained from device failure history record. For example, in instances in which the analysis is directed to server disk failure in one week, ground truth of this failure 318 will be derived from historical records aligned with communication data 314 and profile data 316.

Training temporal graph construction component 320 builds temporal graphs that encode both communication data 314 and device profile data 316. The temporal graph can be stored (or manipulated/sent/received/etc.) as a data structure used to represent data, such as the encoded communication and device profile data, as described herein in detail below with respect to FIG. 4.

Training temporal graph feature extraction component 330 performs temporal graph feature extraction. Training temporal graph feature extraction component 330 extracts temporal graph features from the graph built by training temporal graph construction component 320 and represents each device by a feature vector, as described herein in detail below with respect to FIG. 5.

Model training component 340 trains models to predict device failure. Model training component 340 first prepares training data, learns prediction models based on the training data, and then performs model selection to find the best model, as described herein in detail below with respect to FIG. 6. For example, given a devices' particular historical records, model training component 340 can select a model to predict the value of a predefined performance metric.

Data testing component 350 determines testing data. For example, data testing component 350 can select any communication data 314 (from among communication data provided by devices) along with their device profile data 316 can serve as testing data in this framework.

Testing (or second) temporal graph construction component 360 also perform temporal graph construction (using a similar approach as training (or first) temporal graph construction component 320). Testing temporal graph construction component 360 builds temporal graphs that encode both communication data 314 and device profile data 316 to build a temporal graph for testing data.

Testing temporal graph feature extraction component 370 performs temporal graph feature extraction (using a similar approach as first temporal graph feature extraction component 330). Testing temporal graph feature extraction component 370 extracts the same set of temporal graph features as training temporal graph feature extraction component 330. After testing temporal graph feature extraction component 370 performs temporal graph feature extraction, each device in the testing data is represented as a feature vector.

Device failure prediction component 380 implements device failure prediction. At this stage, device failure prediction component 380 feeds devices' feature vectors into the model trained by model training component 340 and obtains prediction to the device failure for each device.

Prediction results component 390 outputs prediction results for device performance.

Figure 4:
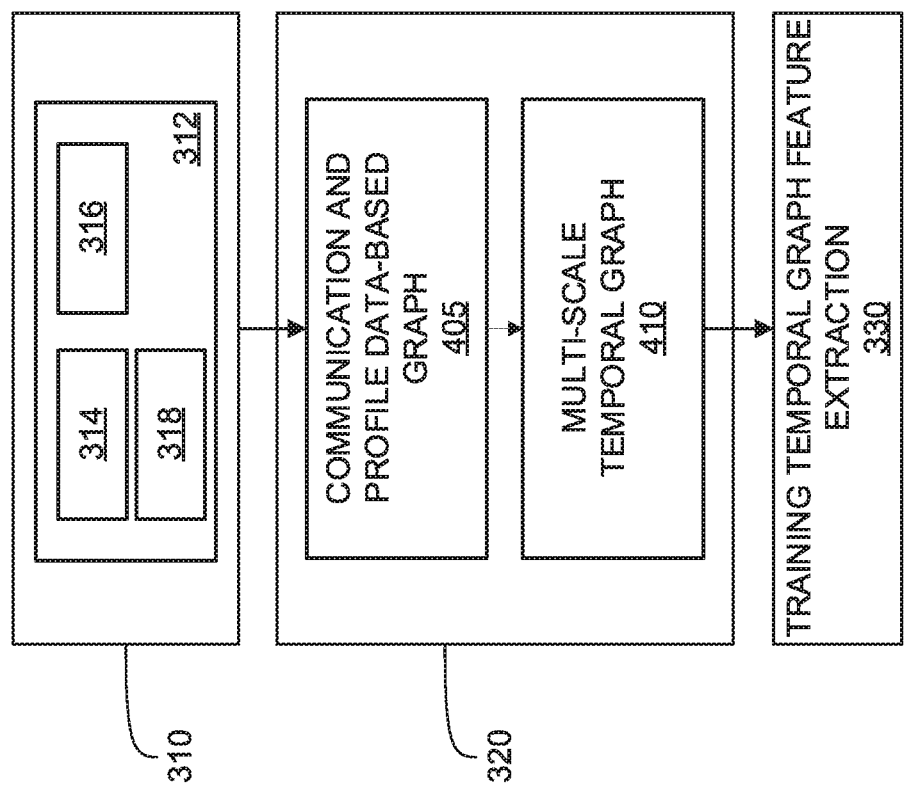
FIG. 4 is a block diagram illustrating a process of temporal graph construction, in accordance with an embodiment of the present invention.

FIG. 4 is a block diagram illustrating a process of temporal graph construction as implemented by training temporal graph construction component 320, in accordance with example embodiments.

As shown in FIG. 4, training temporal graph construction component 320 receives training data 312 (including communication data 314, device profile data 316 and ground truth of target device failure metric 318) from data training component 310. Training temporal graph construction component 320 includes communication and profile data-based graph (component, device or module) 405 and multi-scale temporal graph (component, device or module) 410.

Communication and profile data-based graph 405 builds (constructs or converts) the communication 314 and (device) profile data 316 to a graph(s) (format). Communication and profile data-based graph 405 represents a temporal graph as a stream of graphs<$G_1, G_2, \ldots,$>, where $G_i$ is a graph, referred to as a snapshot, recording communication and profile data for devices at time $t_i$. In each graph $G_i$ nodes are devices, and one edge between node A and B indicates A and B communicated at time $t_i$. Moreover, nodes and edges are associated with attributes, where node attributes include all the information only relevant to itself at time $t_i$, and edge attributes suggest all the information relevant to the corresponding communication. In this way, communication and profile data-based graph 405 encodes all the side (supplementary or complementary) information in device profile data 316 by node attributes, and all the side information in communication data 314 by edge attributes.

Multi-scale temporal graph 410 generates a multi-scale temporal graph(s) based on the graphs constructed by communication and profile data-based graph 405. Time stamps in communications usually can record time at different temporal granularities (for example, the granularity of second). However, at the finest (for example, smallest units) granularities, global temporal evolution can be missed (for example, based on incremental changes over a small time) in instances in which the output is constrained to fine granularity. Multi-scale temporal graph 410 provides varying time perspective views of the evolution of a device's performance and failure, given communication and profile data, by building multiple temporal graphs, each of which is generated at a specific time granularity. For example, given one year of communication and profile data, multi-scale temporal graph 410 can generate multiple (for example, three) temporal graphs, where the first is at the granularity of a minute, the second is at the granularity of an hour, and the third is at the granularity of half-day, etc. Given a time granularity, communication 314 and device profile data 316 are aggregated into each graph snapshot.

After multi-scale temporal graph 410 is implemented, training temporal graph construction component 320 obtains a set of temporal graphs for given communication data 314 and profile data 316.

Figure 5:
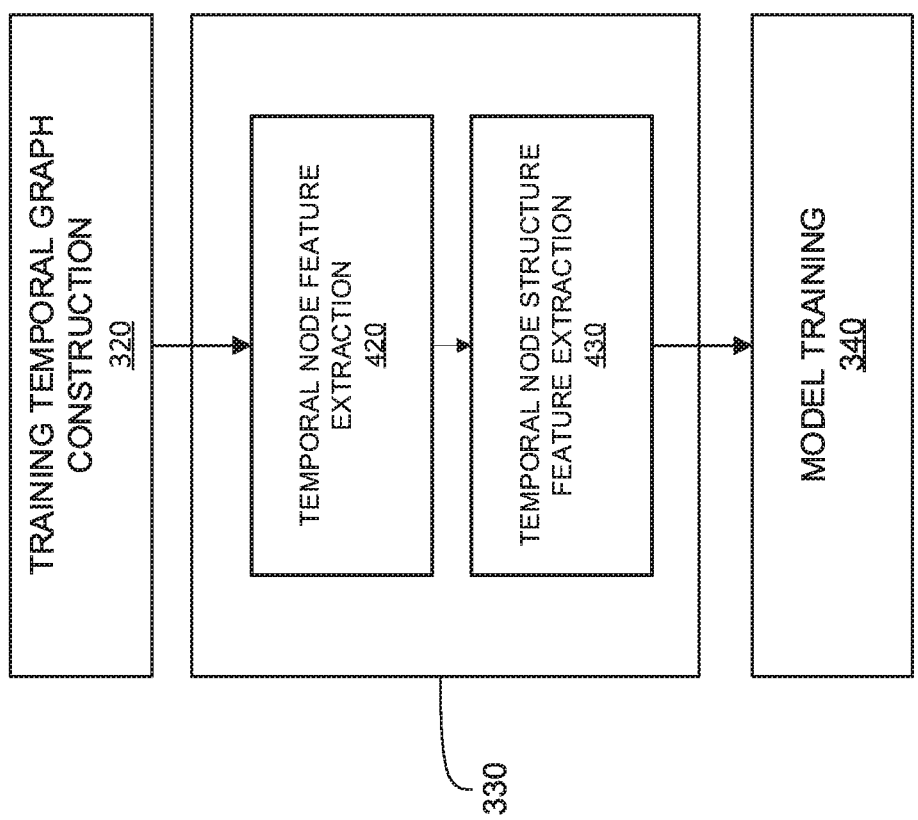
FIG. 5 is a block diagram illustrating a process of temporal graph feature extraction, in accordance with an embodiment of the present invention.

FIG. 5 is a block diagram illustrating a process of temporal graph feature extraction as implemented by training temporal graph feature extraction component 330, in accordance with example embodiments.

As shown in FIG. 5, training temporal graph feature extraction component 330 implements temporal graph feature extraction, given a set of temporal graphs from training temporal graph construction component 320, using temporal node feature extraction (component, device or module) 420 and temporal structure feature extraction (component, device or module) 430.

Temporal node feature extraction 420 performs temporal node feature extraction based on input from training temporal graph construction component 320. Temporal node feature extraction 420 derives node features from node attributes in temporal graphs. Particularly, for each node attribute of a specific node, temporal node feature extraction 420 (for example, essentially) forms a time series. To this end, given a time series of a node attribute, temporal node feature extraction 420 provides a feature vector that profiles this time series. According to example embodiments, temporal node feature extraction 420 can profile a time series from the angle (or perspective, view, etc.) of raw value, statistic measurement, and/or temporal differential measurement, etc.

Temporal node feature extraction 420 can include the raw value of a time series into a feature vector of the time series. Temporal node feature extraction 420 can include static measurement, such as mean, median, variance, etc., to characterize the shape of the time series. Temporal node feature extraction 420 can also include a temporal differential measurement(s). Given a time series (for example, time series a) and a time difference $\Delta t$, temporal node feature extraction 420 can derive another time series (for example, time series b) by differential comparison such as $b[t]=a[t]-a[t-\Delta t]$. Given time series b, temporal node feature extraction 420 can further attach a raw value and statistical measure of time series b into the feature vector.

Temporal structure feature extraction 430 performs temporal structure feature extraction. Temporal structure feature extraction 430 derives structure features from one-hop and multi-hop structure metric. One-hop structure metrics can include node in-degree, node out-degree, and node total degree. In directed graphs, the number of edges going into a node is referred to as the in-degree of the corresponding node and the number of edges coming out of a node is referred to as the out-degree of the corresponding node. Multi-hop structure metrics can be diverse, including random walk-based metric (e.g., page rank, egocentric social network data (for example, Ego-Net™ metrics), clustering analysis metrics, etc.).

Given a temporal graph, a structure metric with respect to a specific node (for example, from a particular perspective, essentially, etc.) forms a time series. In a similar manner as implemented by temporal node feature extraction 420, temporal structure feature extraction 430 derives a feature vector to describe this time series from angles including raw value, statistical measurement, and temporal differential measurement. Note that given a set of temporal graphs, temporal node feature extraction 420 and temporal structure feature extraction 430 will go through (for example, process, analyze, extract, etc.) each temporal graph and generate a node and structure feature vectors of each temporal graph.

For each node, training temporal graph feature extraction component 330 concatenates all node feature vectors and structure feature vectors of the node into a long feature vector, which can be used by model training component 340 for model training.

Figure 6:
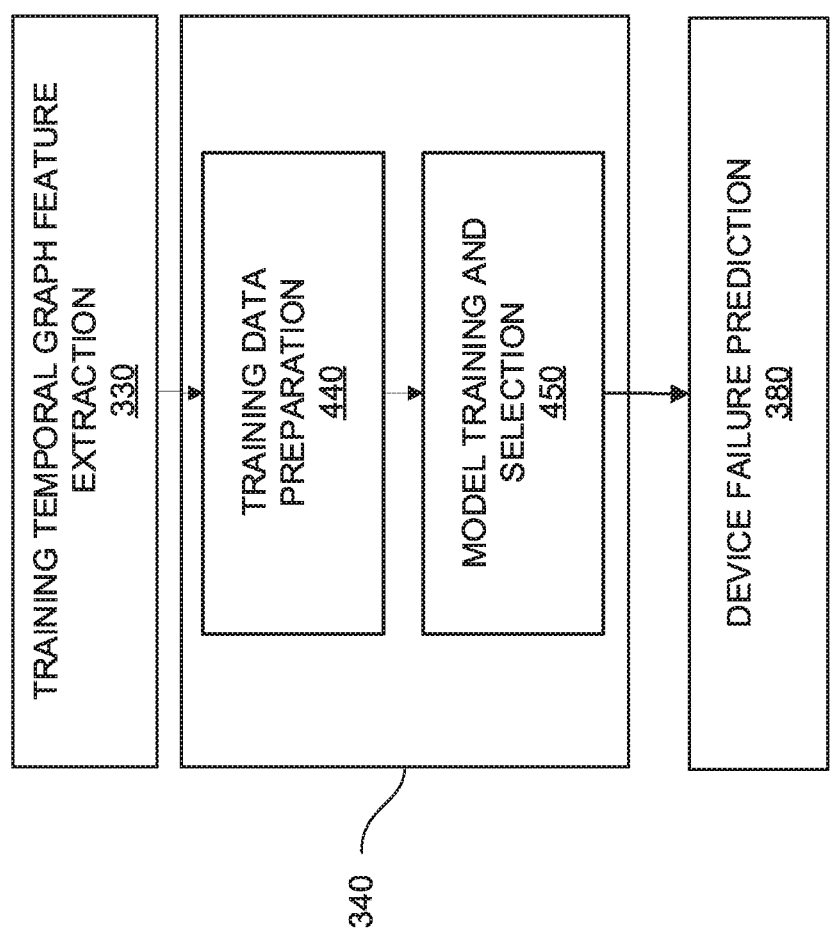
FIG. 6 is a block diagram illustrating model training, in accordance with an embodiment of the present invention.

FIG. 6 is a block diagram illustrating model training as implemented by model training component 340, in accordance with example embodiments.

As shown in FIG. 6, model training component 340 includes training data preparation (component, device or module) 440 and model training and selection (component, device or module) 450.

Training data preparation 440 implements training data preparation. Particularly, training data preparation 440 can prepare a set of training samples. For example, after training temporal graph feature extraction component 330 concatenates all node feature vectors and structure feature vectors of a node into a long feature vector, training data preparation 440 can obtain a feature vector for node k (e.g., a specific device K) $x_k$. From ground truth of target device failure metric 318, training data preparation 440 can obtain the corresponding performance metric value of node k, $y_k$. In this way, training data preparation 440 forms a training sample ($x_k$, $y_k$). Therefore, given feature vectors and ground truth of target device failure metric 318, training data preparation 440 can prepare a set of training samples {(x, y)}.

Model training and selection 450 implements model training and selection. Given a candidate pool of models and training data 312, model training and selection (component, device or module) 450 learns (for example, analyzes and implements trial runs to determine the accuracy of) multiple models and selects a best model (from among the multiple models) for testing phase. Model training and selection 450 can determine a candidate pool (of models) based on machine learning techniques (including predetermined (or user defined) machine learning techniques and off-the-shelf machine learning techniques, such as support vector machines, linear regression, logistic regression, multilayer neural network, decision trees, and ensemble methods, etc.). Model training and selection 450 then selects a model. For example, given a set of trained models, model training and selection 450 use k-fold cross validation to select the model that has the best validation accuracy. Cross-validation is a statistical method used to estimate the skill (for example, accuracy) of machine learning models.

Figure 7:
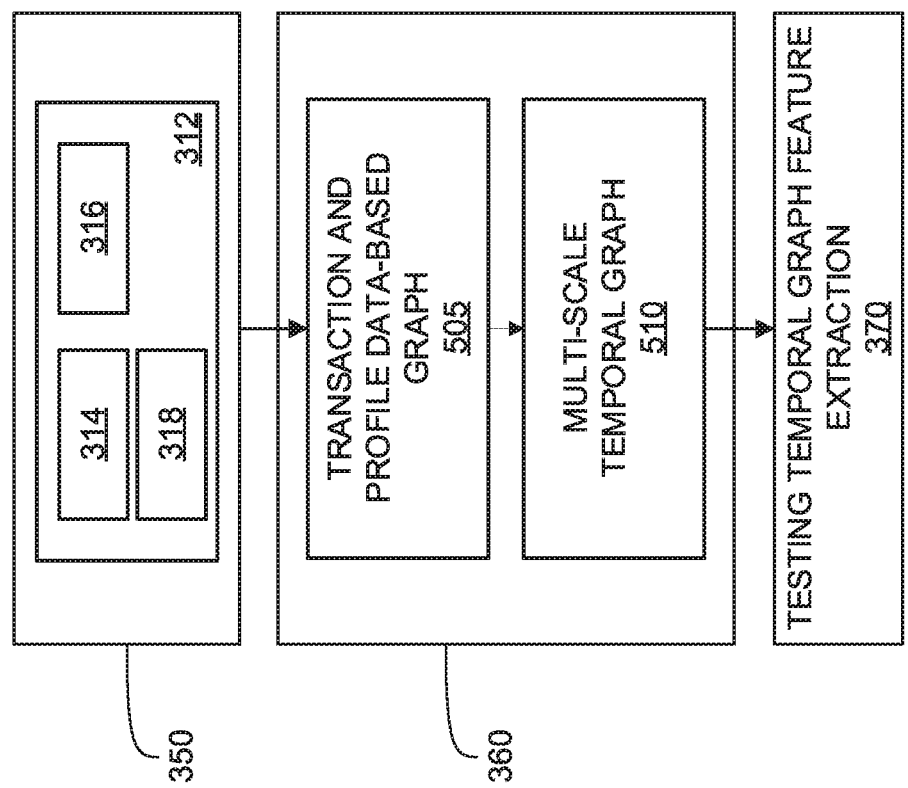
FIG. 7 is a block diagram illustrating a process of temporal graph construction in a testing phase, in accordance with an embodiment of the present invention.

FIG. 7 is a block diagram illustrating a process of temporal graph construction in a testing phase as implemented by testing temporal graph construction component 360, in accordance with example embodiments.

As shown in FIG. 7, testing temporal graph construction component 360 includes communication and profile data-based graph (component, device or module) 505 and multi-scale temporal graph (component, device or module) 510.

Communication and profile data-based graph 505 given communication data 314 and device profile data 316, builds temporal graphs in a similar manner as discussed with respect to communication and profile data-based graph 405 and FIG. 4 herein above.

Multi-scale temporal graph 510, in the testing phase, generates multiple temporal graphs using the time granularities applied by multi-scale temporal graph 410 in the training phase as described with respect to FIG. 4 herein above. The output of multi-scale temporal graph 510 is a set of temporal graphs that encodes communication data 314 and device profile data 316 at the granularities defined in the training phase.

Figure 8:
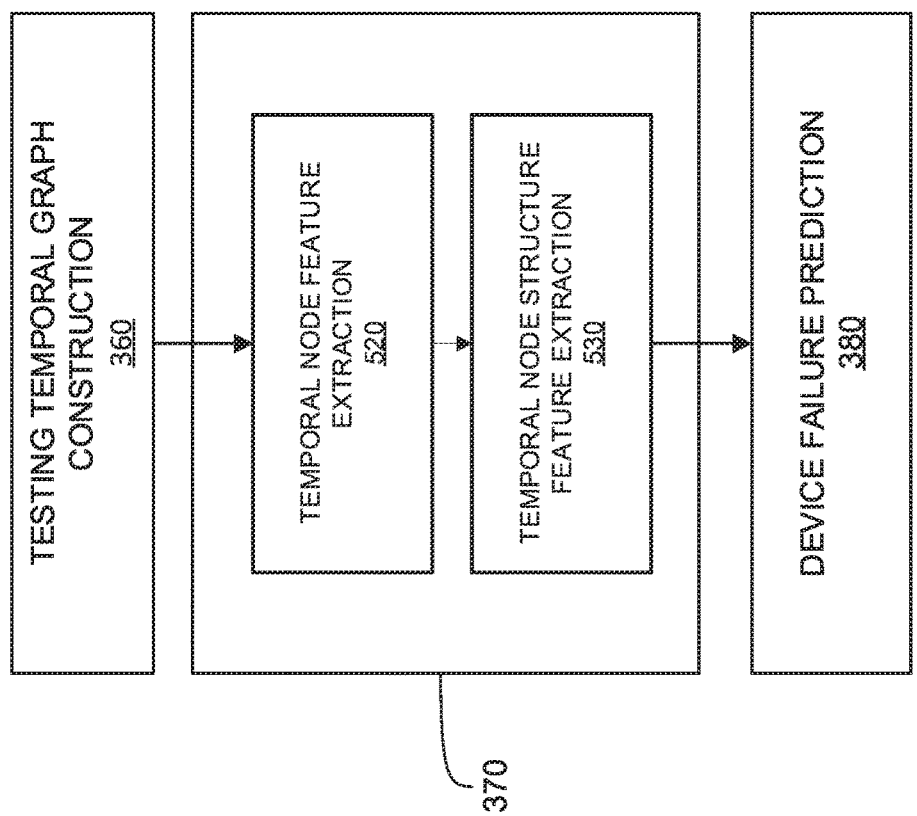
FIG. 8 is a block diagram illustrating a process of temporal graph feature extraction in a testing phase, in accordance with an embodiment of the present invention.

FIG. 8 is a block diagram illustrating a process of temporal graph feature extraction as implemented by testing temporal graph feature extraction component 370, in accordance with example embodiments.

As shown in FIG. 8, testing temporal graph feature extraction component 370 performs temporal graph feature extraction, given a set of temporal graphs from testing temporal graph construction component 360. Testing temporal graph feature extraction component 370 includes temporal node feature extraction 520 and temporal structure feature extraction 530.

Temporal node feature extraction 520, for each node in testing data, builds node feature vectors in a similar manner as implemented by temporal node feature extraction 420 as described herein above with respect to FIG. 5.

Temporal structure feature extraction 530, for each node in testing data, builds structure feature vectors in a similar manner as implemented by temporal node feature extraction 420 as described herein above with respect to FIG. 5.

Note that given a set of temporal graphs, temporal node feature extraction 520 and temporal structure feature extraction 530 can go through each temporal graph and generate node and structure feature vectors as implemented by temporal graph feature extraction component 330. For each node, testing temporal graph feature extraction component 370 can concatenate all node feature vectors and structure feature vectors of the node into a long feature vector, which can be used by device failure prediction component 380 for prediction of a device's performance.

Figure 9:
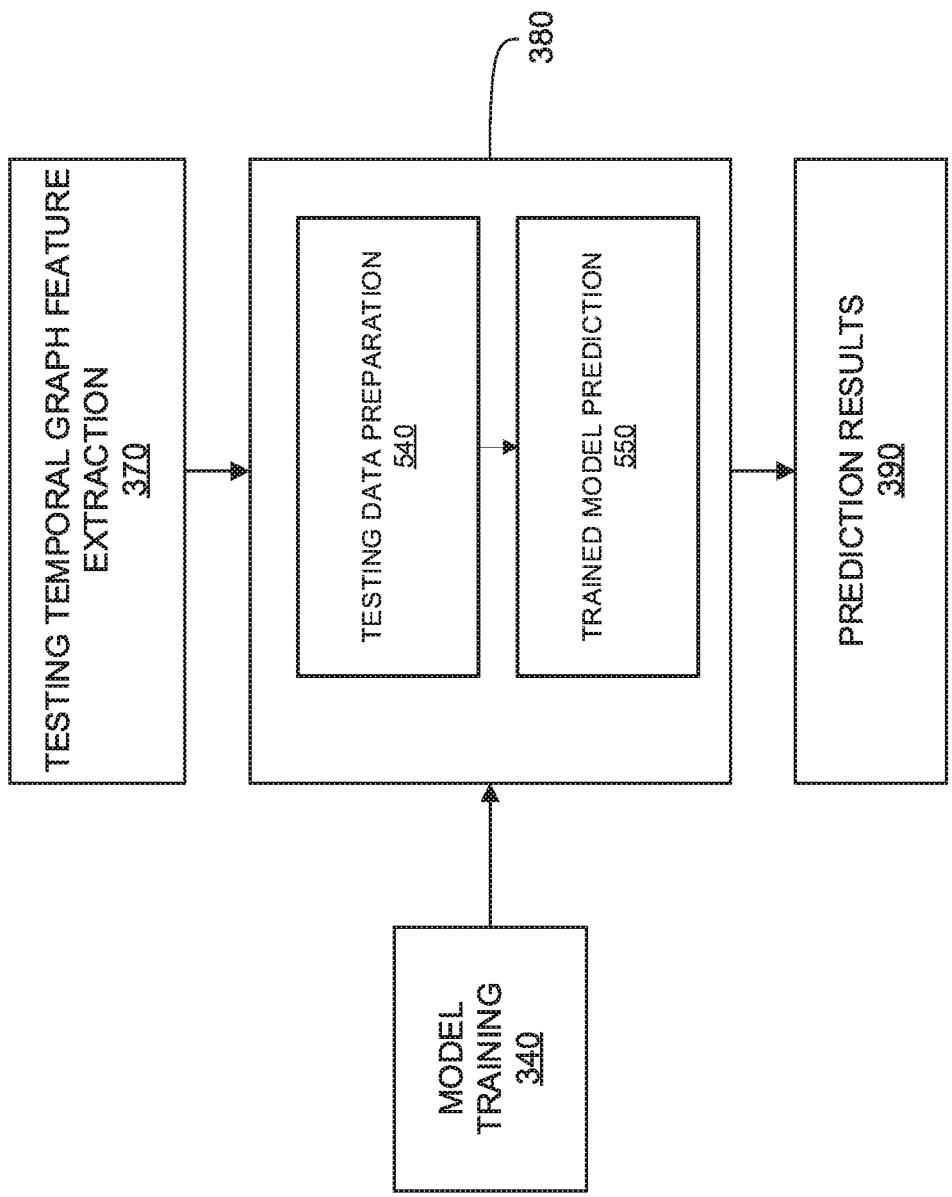
FIG. 9 is a block diagram illustrating a process of device failure prediction, in accordance with an embodiment of the present invention.

FIG. 9 is a block diagram illustrating a process of device failure prediction as implemented by device failure prediction component 380, in accordance with example embodiments.

As shown in FIG. 9, device failure prediction component 380 implements a procedure of device failure prediction using inputs from (for example, models and features of graphs from/provided by) model training component 340 and testing temporal graph feature extraction 370. Device failure prediction component 380 includes testing data preparation (component, device or module) 540 and trained model prediction (component, device or module) 550.

Testing data preparation 540 performs testing data preparation. At this stage, feature vectors of devices from testing temporal graph feature extraction 370 naturally form a set of testing samples. For example, for a node k, a feature vector of the node is $x_k$ from testing temporal graph feature extraction 370, and $x_k$ is a testing sample. Testing data preparation 540 performs accesses the data from testing temporal graph feature extraction 370.

Trained model prediction 550 makes predictions using a trained model. For example, trained model prediction 550 can select and use a best model trained by model training component 340 and devices' feature vectors. Trained model prediction 550 can apply SFPGL to perform predictions of the target performance metric for each device.

The example embodiments of processes described with respect to FIGS. 3 to 9 herein above represent data from system management domain (or a device failure related domain) by multi-scale temporal graphs. With respect to temporal node feature extraction 420/520 in the training and testing phases, that the example embodiments can extract temporal graph features that capture both temporal and structural correlation in system device performance. With respect to model training component 340 and device failure prediction component 380, the example embodiments provide processes that automate the decision process from vector representations of devices to target performance metrics in a system device management domain.

Figure 10:
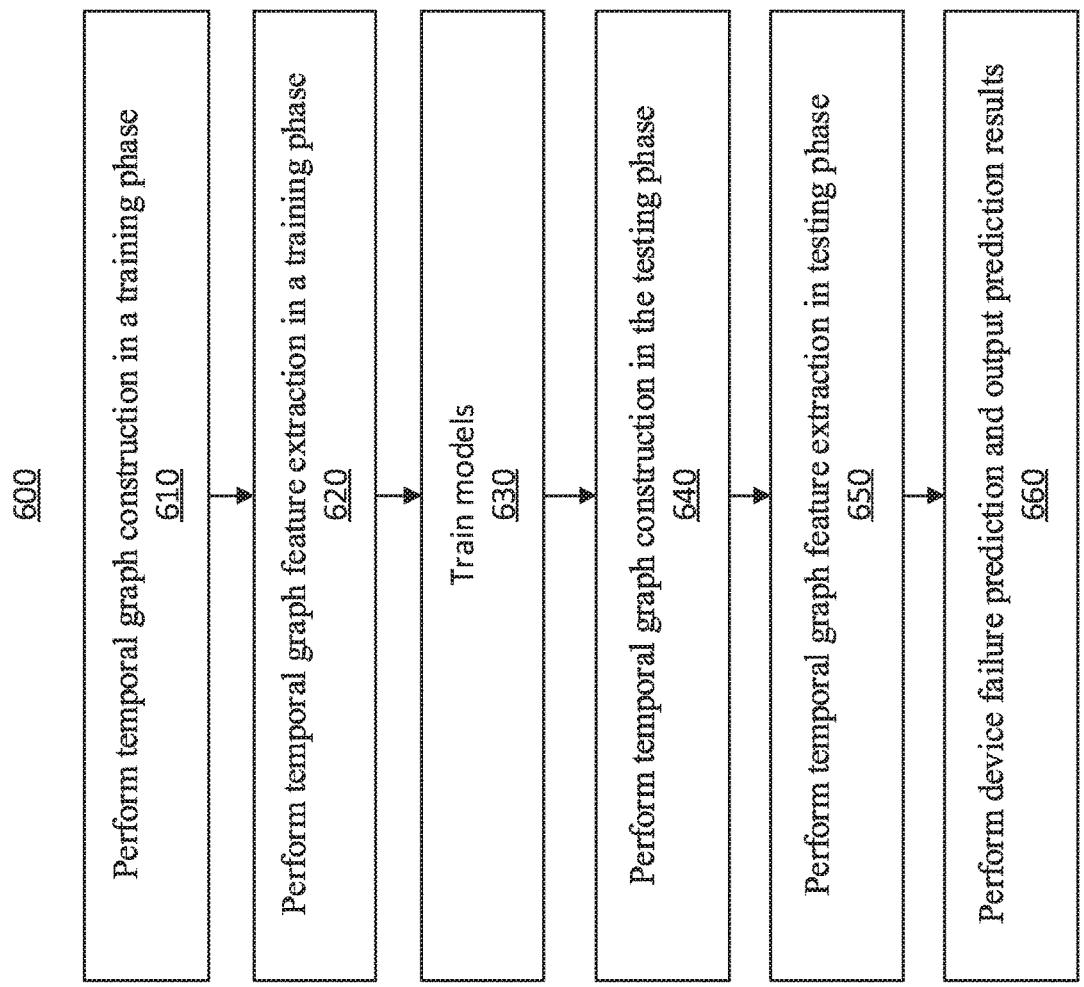
FIG. 10 is a flow diagram illustrating a method of implementing SFPGL for device failure prediction, in accordance with an embodiment of the present invention.

FIG. 10 is a flow diagram illustrating a method 600 for implementing SFPGL for device failure prediction, in accordance with the present invention.

At block 610, system 300 performs temporal graph construction in training phase using device failure related data. For example, system 300 can construct graphs of a device's performance using training data 312 that includes communication data 314, device profile data 316, and ground truth of target device failure metric 318 for devices.

At block 620, system 300 performs temporal graph feature extraction in a training phase. For example, system 300 can derive node features from node attributes in temporal graphs determined at block 610. System 300 can form a time series for each node attribute of a specific node as described herein above with respect to FIG. 5.

At block 630, system 300 performs model training, for example, in a similar manner as described with respect to FIG. 6, herein above. System 300 can train models from a candidate pool of models with training data 312 to identify a best model (from among the multiple models) for testing phase.

At block 640, system 300 performs temporal graph construction in the testing phase. Training data and testing data share identical format or schema, except that there are ground truth or label information in training data, while there are no ground truth or label information in testing data. For example, system 300 can construct graphs of a device's performance using training data 312 that includes communication data 314, device profile data 316, and ground truth of target device failure metric 318 for devices. System 300 can use historical data to determine the temporal graphs.

At block 650, system 300 performs temporal graph feature extraction in testing phase. For example, system 300 can derive node features from node attributes in temporal graphs determined at block 640. System 300 can form a time series for each node attribute of a specific node as described herein above with respect to FIG. 5.

At block 660, system 300 performs device failure prediction. For example, system 300 can predict, based on vector representations of devices, one or more of the devices to target for replacement or repair based on device failure predictions. System 300 can output prediction results 390 based on the trained model and data. The prediction results can be output on an interface (for example a graphical user interface (GUI)) of a device, such as a mobile device, personal computer, etc. The prediction results can include predicted metrics of device failure over an upcoming time span. In some embodiments, system 300 can initiate prophylactic measures based on the prediction results, such as re-routing communications through other devices, adjusting load balancing, etc. System 300 can compare predicted results to actual results and adjust the models or data based on feedback from actual results.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for predicting system device failure, comprising:
    representing device failure related data associated with a plurality of devices from a predetermined domain by at least one temporal graph for each of the plurality of devices;
    extracting, by a processor device, vector representations based on temporal graph features from the at least one temporal graph that capture both temporal and structural correlation in the device failure related data;
    predicting, based on the vector representations and at least one device failure related metric in the predetermined domain, at least one of the plurality of devices that is expected to fail within a predetermined time;
    outputting the at least one of the plurality of devices with a predicted device failure metric; and
    replacing the at least one of the plurality of devices prior to an impending failure, based on the failure metric,
    wherein representing the device failure related data further comprises:
    performing, by the processor device, temporal graph construction using training data for at least one entity in a training phase to determine at least one first temporal graph; and performing temporal graph feature extraction from the at least one first temporal graph in the training phase to derive at least one first feature vector.

2. The method as recited in claim 1, further comprising:
    training, by the processor device, a plurality of models for system failure prediction via graph learning (SFPGL) for device failure prediction based on the at least one temporal graph.

3. The method as recited in claim 2, wherein training the plurality of models further comprises:
    preparing training data;
    learning prediction models from the plurality of models based on the training data; and
    performing model selection to find a best model of the plurality of models.

4. The method as recited in claim 1, further comprising:
    performing, by the processor device, temporal graph construction in a testing phase to determine at least one second temporal graph;
    performing temporal graph feature extraction from the at least one second temporal graph in the testing phase to derive at least one second feature vector; and
    performing device failure prediction based on the at least one second feature vector and outputting at least one prediction result.

5. The method as recited in claim 4, wherein the device failure related data includes communication data and device profile data and performing temporal graph construction iii the testing phase further comprises:
    encoding the communication data and the device profile data.

6. The method as recited in claim 4, wherein performing temporal graph construction further comprises:
generating at least one multi-scale temporal graph at multiple time granularities.

7. The method as recited in claim 4, wherein performing temporal graph feature extraction from the at least one second temporal graph further comprises
profiling a time series based on at least one of a raw value, a statistic measurement and a temporal differential measurement.

8. The method as recited in claim 4, wherein performing temporal graph feature extraction from the at least one second temporal graph further comprises:
deriving structure features from a one-hop metric.

9. The method as r d in claim 4, wherein performing temporal graph feature extraction from the at least one second temporal graph further comprises:
deriving structure features from a multi-hop metric.

10. The method as recited in claim 1, wherein each at least one temporal graph is represented as a stream or graphs<$G_1$ to $G_x$>, where $G_i$ is a graph that records communication data and profile data for devices at time $t_i$.

11. The method as recited in claim 1, wherein nodes and edges of each at least one temporal graph are associated with attributes, where node attributes include all information only relevant to a node at time $t_i$, and edge attributes include information relevant to a corresponding communication.

12. A computer system for predicting system device failure, comprising:
a processor device operatively coupled to a memory device, the processor device being configured to:
represent device failure related data associated with a plurality of devices from a predetermined domain by at least one temporal graph for each of the plurality of devices;
extract vector representations based on temporal graph features from the at least one temporal graph that capture both temporal and structural correlation in the device failure related data;
predict, based on the vector representations and at least one device failure related metric in the predetermined domain, at least one of the plurality of devices that is expected to fail within a predetermined time; and
replace the at least one of the plurality of devices prior to an impending failure, based on the failure metric,
wherein, when representing the device failure related data, the processor device is further configured to:
perform temporal graph construction using training data for at least one entity in a training phase to determine at least one first temporal graph; and
perform temporal graph feature extraction from the at least one first temporal graph in the training phase to derive at least one first feature vector.

13. The system as recited in claim 12, wherein the processor device is further configured to:
train a plurality of models for system failure prediction via graph learning (SFPGL) for device failure prediction based on the at least one temporal graph.

14. The system as recited in claim 12, wherein, when raining the plurality of models, the processor device is further configured to:
prepare training data;
learn prediction models from the plurality of models based on the training data; and
perform model selection to find a best model of the plurality of models.

15. The system as recited in claim 14, wherein the processor device is further configured to:
perform device failure prediction by feeding the vector representations into the best model.

16. The system as recited in claim 12, wherein each at least one temporal graph is represented as a stream of graphs<$G_1$ to $G_x$>, where $G_i$ is a graph that records communication data and profile data for devices at time $t_i$.

17. The system as recited in claim 12, wherein nodes and edges of each at least one temporal graph are associated with attributes, where node attributes include all information only relevant to a node at time $t_i$, and edge attributes include information relevant to a corresponding communication.

18. A computer program product for predicting performance of a plurality of devices, the computer program product comprising a non-transitory computer readable storage medium having program instructions embodied therewith, the program instructions executable by a computing device to cause the computing device to perform the method comprising:
representing device failure related data associated with the plurality of devices from a predetermined domain by at least one temporal graph for each of the plurality of devices;
extracting vector representations based on temporal graph features from the at least one temporal graph that capture both temporal and structural correlation in the device failure related data;
predicting, based on the vector representations and at least one performance metric in the predetermined domain, at least one of the plurality of devices that is expected to fail within a predetermined time; and
replacing the at least one of the plurality of devices prior to an impending failure based on the failure metric,
wherein representing the device failure related data further comprises:
performing, by the processor device, temporal graph construction using training data for at least one entity in a training phase to determine at least one first temporal graph; and
performing temporal graph feature extraction from the at least one first temporal graph in the training phase to derive at least one first feature vector.

* * * * *